United States Patent
Dry et al.

(10) Patent No.: US 11,498,285 B2
(45) Date of Patent: Nov. 15, 2022

(54) AGILE ROBOTIC HEADLAMP ASSEMBLY WITH SONIC FASTENING AND INJECTED LENS ADHESIVE

(71) Applicant: Ford Global Technologies, LLC, Dearborn, MI (US)

(72) Inventors: Alan George Dry, Grosse Pointe Woods, MI (US); David A. Brown, Plymouth, MI (US); Robert William Miller, Inkster, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 17/039,598

(22) Filed: Sep. 30, 2020

(65) Prior Publication Data
US 2022/0097312 A1    Mar. 31, 2022

(51) Int. Cl.
  *B23P 19/04*    (2006.01)
  *B25J 11/00*    (2006.01)
  (Continued)

(52) U.S. Cl.
  CPC .............. *B29C 65/72* (2013.01); *B23P 19/04* (2013.01); *B25J 11/005* (2013.01); *B25J 15/008* (2013.01);
  (Continued)

(58) Field of Classification Search
  CPC ... B29C 65/645; B29C 65/606; B29C 65/542; B29C 66/742; B25J 11/005; B25J 15/008; B23P 19/04; B23P 21/004; B23P 21/006; B23P 2700/50; Y10T 29/49895; Y10T 29/49904; Y10T 29/49831;
  (Continued)

(56) References Cited

U.S. PATENT DOCUMENTS

| | | | | |
|---|---|---|---|---|
| 4,894,901 A | * | 1/1990 | Soderberg | B23P 19/001 29/428 |
| 6,327,768 B1 | * | 12/2001 | Cappa | B23P 19/04 29/407.1 |

(Continued)

FOREIGN PATENT DOCUMENTS

| | | |
|---|---|---|
| CN | 102536981 | 7/2012 |
| CN | 104942438 | 9/2015 |

(Continued)

*Primary Examiner* — Jermie E Cozart
(74) *Attorney, Agent, or Firm* — Burris Law, PLLC (57) ABSTRACT

A system for assembling a plurality of components into an assembly is provided. The system includes an installation table, a first transfer robot, a second transfer robot, and an adhesive dispensing robot. The first transfer robot is configured to assemble some of the plurality of components into a first sub-assembly and transfer the first sub-assembly to the installation table. The second transfer robot is configured to assemble remaining ones of the plurality of components into a second sub-assembly, transfer the second sub-assembly to the installation table, and attach the second sub-assembly to the first sub-assembly. The adhesive dispensing robot is configured to apply an adhesive between the first sub-assembly and the second sub-assembly, after the second sub-assembly is attached to the first sub-assembly, to bond the second sub-assembly to the first sub-assembly.

20 Claims, 8 Drawing Sheets

(51) Int. Cl.
*B25J 15/00* (2006.01)
*B23P 21/00* (2006.01)
*B29C 65/72* (2006.01)
*B29C 65/78* (2006.01)
*B29C 65/08* (2006.01)
*B29C 65/00* (2006.01)
*B29C 65/52* (2006.01)
*B29C 65/60* (2006.01)
*B29C 65/54* (2006.01)
*B29C 65/64* (2006.01)

(52) U.S. Cl.
CPC .............. *B29C 65/08* (2013.01); *B29C 65/52* (2013.01); *B29C 65/7858* (2013.01); *B29C 66/742* (2013.01); *B23P 21/004* (2013.01); *B23P 21/006* (2013.01); *B23P 2700/50* (2013.01); *B29C 65/542* (2013.01); *B29C 65/606* (2013.01); *B29C 65/645* (2013.01); *Y10T 29/49829* (2015.01); *Y10T 29/49831* (2015.01); *Y10T 29/49895* (2015.01); *Y10T 29/49901* (2015.01); *Y10T 29/49904* (2015.01); *Y10T 29/5337* (2015.01); *Y10T 29/53417* (2015.01); *Y10T 29/53435* (2015.01)

(58) Field of Classification Search
CPC ......... Y10T 29/49829; Y10T 29/49901; Y10T 29/49622; Y10T 29/53417; Y10T 29/53435; Y10T 29/5337
See application file for complete search history.

(56) References Cited

U.S. PATENT DOCUMENTS

| | | | | |
|---|---|---|---|---|
| 2001/0003861 A1* | 6/2001 | Mayr | ................... | B23P 21/004 29/407.04 |
| 2005/0034960 A1* | 2/2005 | Shimamura | ............. | B81C 3/002 198/346.1 |
| 2005/0044700 A1* | 3/2005 | Ghuman | ............... | B23P 21/004 29/791 |
| 2005/0223532 A1* | 10/2005 | Ghuman | ................ | B62D 65/00 29/407.09 |
| 2008/0220955 A1* | 9/2008 | Hesse | ................... | B23P 21/006 29/33 P |
| 2010/0287767 A1* | 11/2010 | Woo | ..................... | B23P 21/004 29/823 |
| 2012/0145514 A1* | 6/2012 | Magni | ................... | B62D 65/02 198/345.1 |
| 2014/0007432 A1* | 1/2014 | Grevener | ............... | B62D 65/12 29/897.2 |
| 2014/0165387 A1* | 6/2014 | Jin | ........................ | B23P 19/107 29/281.4 |
| 2016/0158877 A1* | 6/2016 | Ballough | ............... | B29C 66/54 228/1.1 |
| 2018/0086403 A1* | 3/2018 | Kawasaki | .............. | B23P 19/10 |
| 2018/0207703 A1* | 7/2018 | Brown | .................. | B25J 15/008 |

FOREIGN PATENT DOCUMENTS

| | | |
|---|---|---|
| CN | 108515329 | 9/2018 |
| CN | 109420896 | 3/2019 |
| KR | 1020150114061 | 10/2015 |

* cited by examiner

AGILE ROBOTIC HEADLAMP ASSEMBLY WITH SONIC FASTENING AND INJECTED LENS ADHESIVE

FIELD

The present disclosure relates to systems and methods for assembling components into an assembly, and more particularly to automated systems for joining dissimilar materials including plastic materials to form an assembly.

BACKGROUND

The statements in this section merely provide background information related to the present disclosure and may not constitute prior art.

Plastic components are frequently integrated into other manufactured components as a way to reduce costs and create lighterweight products. Heat staking, also known as thermoplastic staking, is a process of joining two dissimilar materials together, where a portion of the plastic components is melted by heating and reformed after cooling in order to retain or join the component parts together. This creates a solid, hardware-free bond that uses the plastic's inherent strength to keep the finished assembly together To connect a metal component to a plastic component by heat staking, the plastic is melted around an insert of the metal component. The metal component needs to be sufficiently heated before the metal component is pressed into the plastic component to melt the plastic around the metal component. It is time consuming to heat the metal component before the metal component is inserted into the plastic component and cool the bonding interface between the metal component and the plastic component.

The above-mentioned issues are addressed in the present disclosure.

SUMMARY

In one form of the present disclosure, a system for assembling a plurality of components into an assembly is provided. The system includes an installation table, a first transfer robot, a second transfer robot, and an adhesive dispensing robot. The first transfer robot is configured to assemble some of the plurality of components into a first sub-assembly and transfer the first sub-assembly to the installation table. The second transfer robot is configured to assemble remaining ones of the plurality of components into a second sub-assembly, transfer the second sub-assembly to the installation table, and attach the second sub-assembly to the first sub-assembly. The adhesive dispensing robot is configured to apply an adhesive between the first sub-assembly and the second sub-assembly, after the second sub-assembly is attached to the first sub-assembly, to bond the second sub-assembly to the first sub-assembly.

In other features, the system further includes a first welding robot configured to sonically weld the some of the plurality of components into the first sub-assembly, and a second welding robot configured to sonically weld the remaining ones of the plurality of components into the second sub-assembly. The first transfer robot and the first welding robot are configured to assemble and weld the plurality of first components into the first sub-assembly when the second transfer robot and the second welding robotic assemble and weld the remaining ones of the plurality of components into the second sub-assembly. The system further includes a first tilting table on which the first sub-assembly is assembled and welded, and a second tilting table on which the second sub-assembly is assembled and welded. The first tilting table, the installation table, and the second tilting table are aligned with the installation table disposed between the first and second title tables. The first and second welding robots are disposed above the first and second tilting tables, respectively. The first and second transfer robots are disposed on opposing sides of the installation table. The adhesive dispensing robot is disposed above the installation table. The first sub-assembly is a carrier assembly including a peripheral trench, and the second sub-assembly is a lens assembly including a peripheral rib. The carrier assembly is assembled to the lens assembly by inserting the peripheral rib into the peripheral trench. The adhesive dispensing robot is configured to inject the adhesive into the peripheral trench after the peripheral rib is inserted into the peripheral trench. The system further includes a cell in which the first and second transfer robots, the first and second welding robots, the adhesive dispensing robot, and the first and second tilting tables, and the installation table are disposed.

In another form of the present disclosure, a system for forming an assembly is provided, which includes a first transfer robot, a first sonic-welding robot, and an adhesive dispensing robot. The first transfer robot is configured to attach a first component to a second component. The first sonic-welding robot is configured to sonically weld at least one of the first component part and the second component part. The adhesive dispensing robot is configured to apply an adhesive between the first component and the second component to bond the first component to the second component to form a first sub-assembly.

In other features, the first component defines an opening, and the second component includes a stake portion to be inserted into the opening of the first component. The first transfer robot is configured to insert the stake portion of the second component into the opening of the first component. The first sonic-welding robot is configured to sonically weld the stake portion of the second component to form an enlarged portion. At least one of the first component and the second component defines at least one port in fluid communication with a space between the first and second components such that an adhesive is injected by the adhesive dispensing robot into the space between the first and second components through the at least one port. The system further includes a second transfer robot configured to attach a third component to a fourth component, and a second sonic-welding robot configured to sonically weld at least one of the third component part and the fourth component. The adhesive dispensing robot is configured to apply the adhesive between the third component and the fourth component to bond the third component to the fourth component to form a second sub-assembly. The first sub-assembly is assembled and welded by the first transfer robot and the first sonic welding robot when the second sub-assembly is assembled and welded by the second transfer robot and the second sonic welding robot in a same cell.

It should be noted that the features which are set out individually in the following description can be combined with each other in any technically advantageous manner and set out other variations of the present disclosure. The description additionally characterizes and specifies the present disclosure, in particular in connection with the figures.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
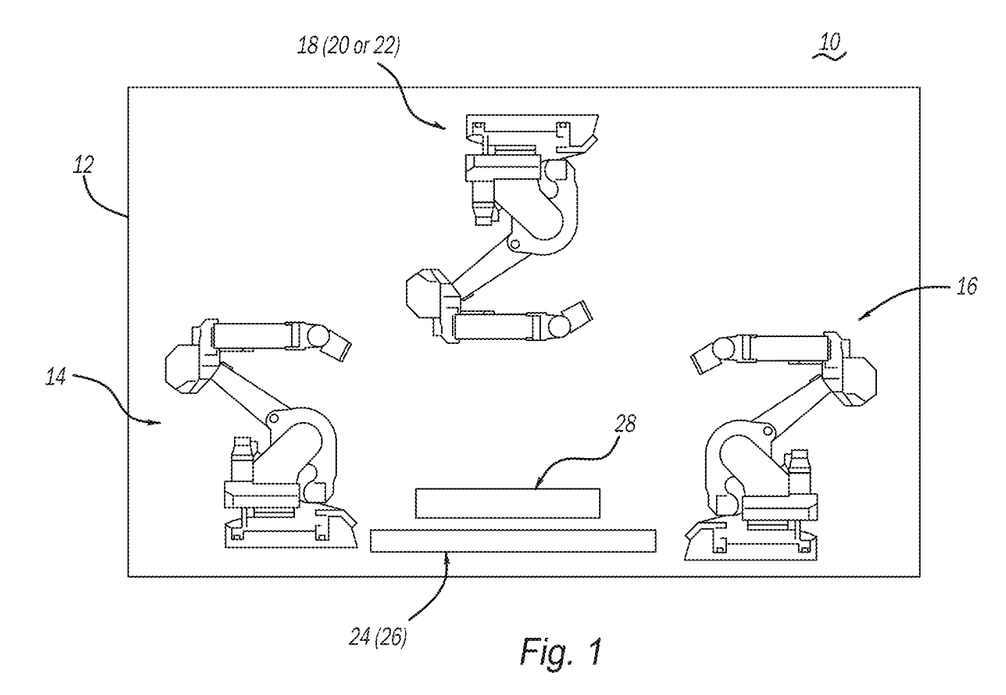
FIG. 1 is a schematic view of a system for assembling a plurality of components into an assembly constructed in accordance with the teachings of the present disclosure.

Referring to FIG. 1, a system 10 for assembling a plurality of components into an assembly includes a cell 12, a plurality of robots, and a plurality of tables disposed inside the cell 12. The plurality of components may be made of dissimilar materials and one or more of the plurality of components are made of thermoplastic materials. The plurality of robots include a first transfer robot 14, a second transfer robot 16, a first welding robot 18, a second welding robot 20, and an adhesive dispensing robot 22. The plurality of tables include a first tilting table 24 on which a first sub-assembly is assembled, a second tilting table 26 on which a second sub-assembly is assembled, and a fixed table 28 on which the first sub-assembly is installed to the second sub-assembly to form a final assembly. The first and second tilting tables 24 and 26, being able to rotate and tile at different angles, enable full access for the sonic fastening horns of the first and second welding robots 18, 20 and perpendicular staking by the first and second transfer robots 14, 16, which will be described in more detail below.

The plurality of robots 14, 16, 18, 20, 22 may each include a robotic arm and one or more end effectors removably mounted to the robotic arm to build a wide variety of products depending on needs. The first welding robot 18 and the second welding robot 20 are configured to use high-frequency vibrations that are transmitted through a pneumatic cylinder with an ultrasonic horn to provide sonic-welding. The rapid vibration generates heat that melts an insert of a plastic component to form an enlarged portion, thereby retaining the plastic component onto another component, such as a metallic component. In order to complete ultrasonic welding or insertion, an ultrasonic horn, an electronic power supply, an energy transducer, and timers are required to control vibration cycles. The end effectors for the first and second welding robots 18, 20 may be one of a bar horn, a catenoidal tapped horn, an ultrasonic blank welding tip, an ultrasonic spot-welding tip, an ultrasonic knurled tip, an ultrasonic rosette tip.

Figure 2:
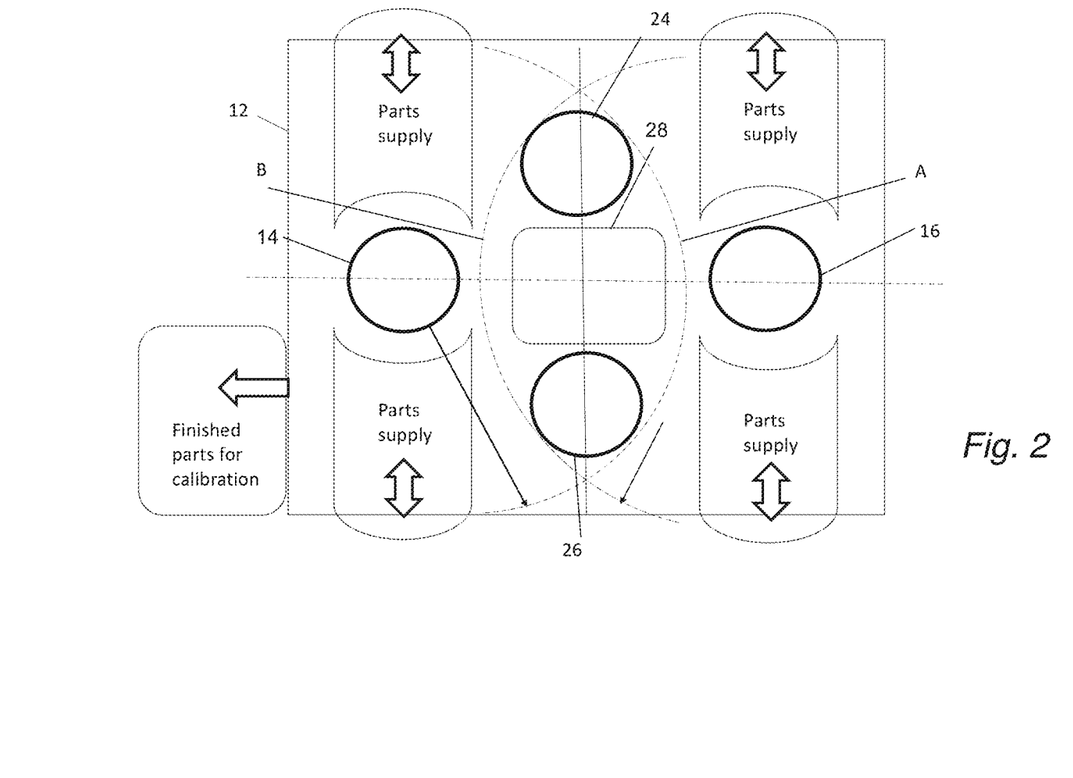
FIG. 2 is another schematic view of a system for assembling a plurality of components into an assembly constructed in accordance with the teachings of the present disclosure.

Referring to FIG. 2, as an example, the first tilting table 24, the second tilting table 26, and the fixed table 28 may be aligned with the fixed tables 28 disposed in the middle. The first transfer robot 14 and the second transfer robot 16 may be disposed on opposing sides of the plurality of tables. Each of the first transfer robot 14 and the second transfer robot 16 can transfer components (e.g., along curved paths A, B) to the first and second tilting tables 24, 26 for assembling. The components for forming a first sub-assembly are transferred to the first tilting table 24. The components for forming a second sub-assembly are transferred to the second tilting table 26.

Figure 3:
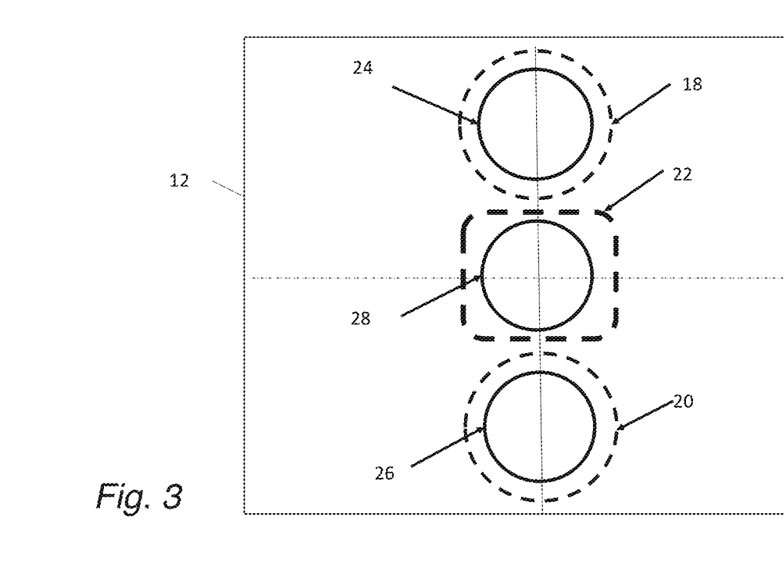
FIG. 3 is still another schematic view of a system for assembling a plurality of components into an assembly constructed in accordance with the teachings of the present disclosure.

Referring to FIG. 3, the first and second welding robots 18, 20 and the adhesive dispensing robot 22 may be disposed above the first tilting table 24, the second tilting table 26, and the fixed table 28, respectively. The first welding robot 18 is configured to sonically weld some of the components placed on the first tilting table 24 for forming the first sub-assembly. The second welding robot 20 is configured to sonically weld some of the components placed on the second tilting table 26 for forming the second sub-assembly.

The adhesive dispensing robot 22 is configured to inject an adhesive into a first sub-assembly being assembled on the first tilting table 24, and into a second sub-assembly being assembled on the second tilting table 26 depending on applications. After the first and second sub-assemblies are completely assembled on the first and second tilting tables 24 and 26, the first transfer robot 14 and the second transfer robot 16 transfer the first and second sub-assemblies to the fixed table 28 for a subsequent adhesive bonding process by the adhesive dispensing robot 22. After the first and second sub-assemblies are assembled, the final assembly is placed on a rack for curing prior to testing, such as a pressure testing.

Figure 4:
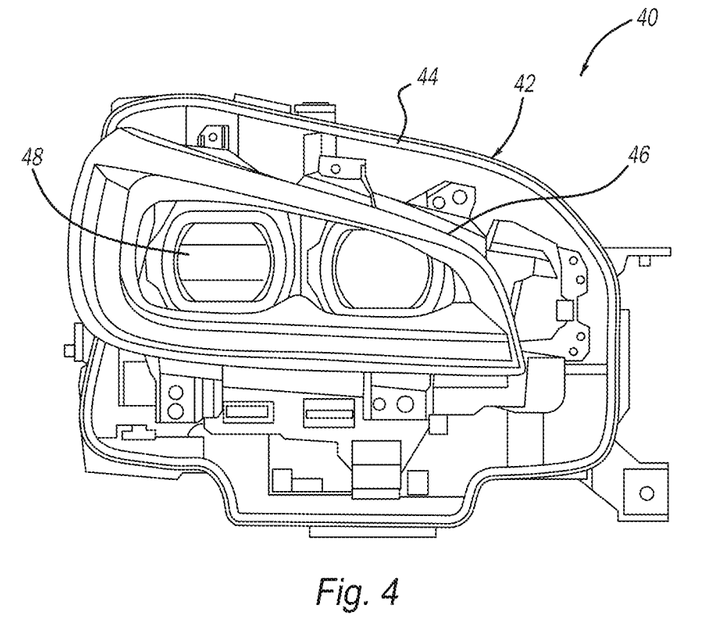
FIG. 4 is a perspective view of a carrier assembly assembled by a system for assembling a plurality of components into an assembly constructed in accordance with the teachings of the present disclosure.

Referring to FIG. 4, as an example, the assembly may be a headlamp assembly including a carrier assembly 40 as the first sub-assembly and a lens assembly 70 (shown in FIG. 7) as the second sub-assembly. The carrier assembly 40 includes a carrier shell 42 defining a trench 44 along the periphery of the carrier shell 42. The carrier assembly 40 further includes a plurality of components, such as a sealing plate 46, a lighting unit 48, a power unit 50, wire harnesses 52 (shown in FIGS. 5A-5C) mounted to the carrier shell 42.

Figures 5A, 5C:
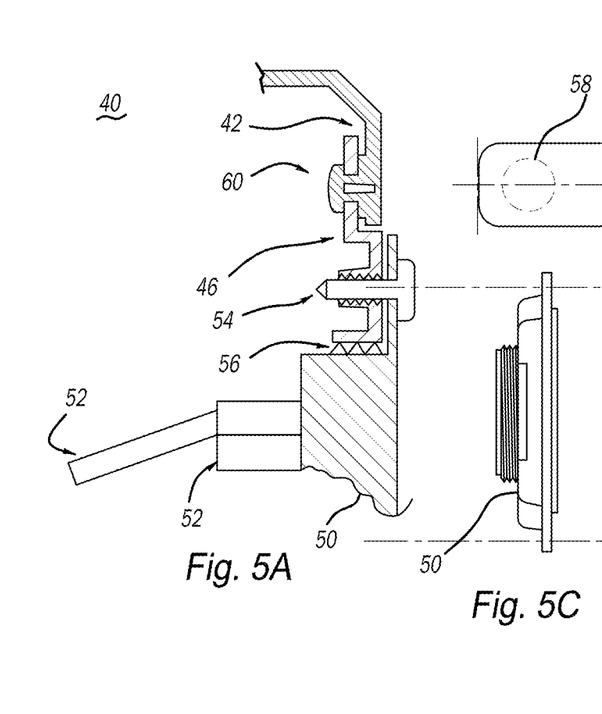
FIG. 5A is a schematic cross-sectional view of a portion of the carrier assembly of FIG. 4.
FIG. 5C is a side view of a power unit mounted to the carrier assembly of FIG. 5A.
Figure 5B:
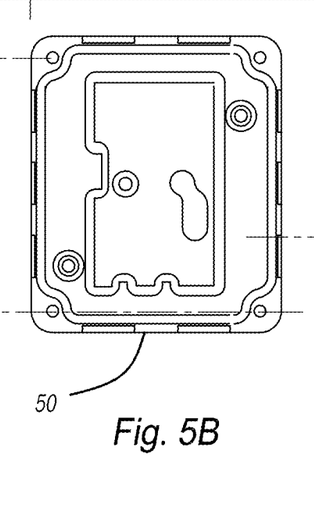
FIG. 5B is a plan view of a sealing plate and a power unit installed to the carrier shell of the carrier assembly of FIG. 5A.

Referring to FIGS. 5A to 5C, the power unit 50 may be mounted to the sealing plate 46 by screws 54. An adhesive 56 may be injected by the adhesive dispensing robot 22 into a space between the sealing plate 46 and the power unit 50. The sealing plate 46 defines a plurality of openings 58 for receiving stake portions 60 of the carrier shell 42.

Figure 6A:
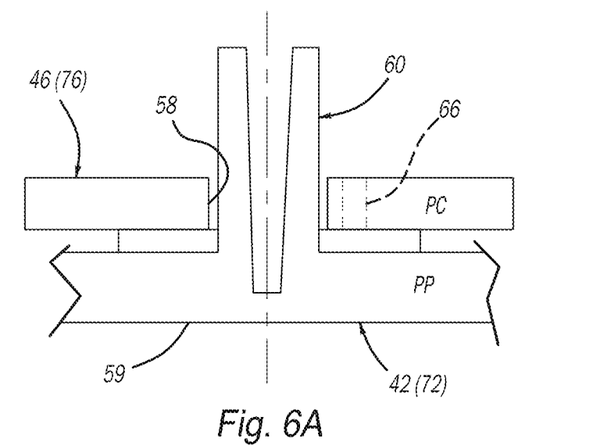
FIGS. 6A and 6B depict a method of assembling two components together by sonic-staking and adhesive bonding.
Figure 6B:
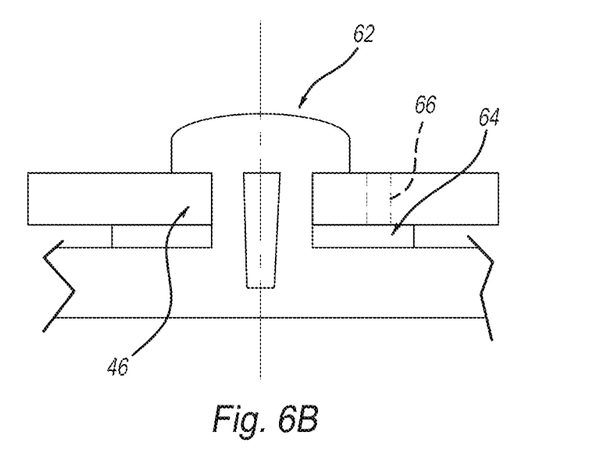

Referring to FIGS. 6A and 6B, the carrier shell 42 may include a body portion 59 and a plurality of stake portions 60 (only one is shown in FIGS. 6A and 6B) protruding from the body portion 59. The stake portions 60 are first inserted into openings 58 of the sealing plate 46 and are held in position by at least one of the first and second transfer robots 14 and 16 or by any locking feature formed on the sealing plate 46 or the carrier shell 42. Then, the first welding robot 24 sonically welds the stake portions 60 to form an enlarged portion, such as a rivet head 62. The adhesive dispensing robot 22 then injects an adhesive into a space 64 between the carrier shell 42 and the sealing plate 46 through one or more ports 66 to bond the sealing plate 46 to the carrier shell 42. The adhesive also forms a water seal or airtight seal between the carrier shell 42 and the sealing plate 46.

While not shown in the drawings, it is understood that a plurality of components may be installed to the sealing plate 46 or the carrier shell 42 by screws 54, by the sonic-staking method described in FIGS. 6A and 6B, and/or by any other conventional fastening means/methods to complete the carrier assembly 40.

Figure 7:
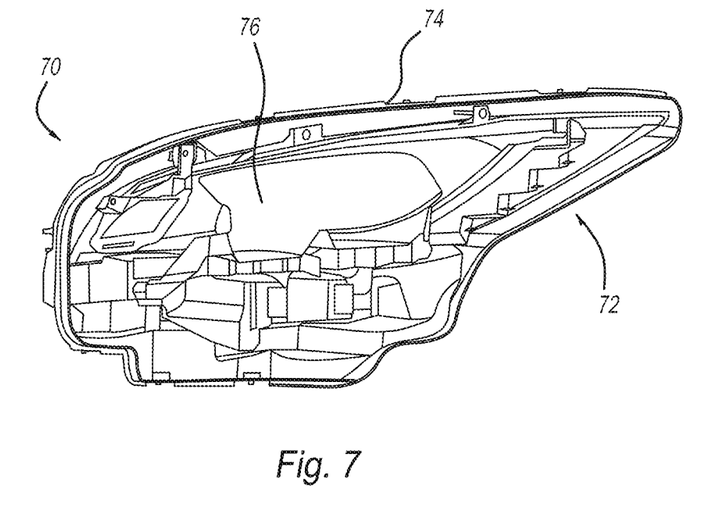
FIG. 7 is a perspective view of a lens assembly assembled by a system for assembling a plurality of components into an assembly constructed in accordance with the teachings of the present disclosure.

Referring to FIG. 7, the lens assembly 70 as the second sub-assembly for the headlamp assembly may include a frame 72 and a rib 74 along the periphery of the lens assembly 70. The lens assembly 70 further includes a plurality of components, such as a lens 76, mounted to the frame 72. Similarly, as shown in FIGS. 6A and 6B, the frame 72 may include a plurality of stake portions 60, and the lens 76 may include a plurality of openings 58 to allow the stake portions 60 of the frame 72 to be inserted. The second welding robot 26 sonically welds the stake portions 60 to form riveted heads 62 to fasten the frame 72 to the lens 76. Thereafter, the adhesive dispensing robot 22 may inject an adhesive between a space 64 between the frame 72 and the lens 76 to bond the lens 76 to the frame 72. Similarly, while not shown in figures, the lens assembly 70 may include a plurality of components that may be installed to the frame 72 by screws 54, by the sonic-staking method described in connection with FIGS. 6A and 6B, and/or by any conventional fastening means/methods to complete the lens assembly 70.

Referring to FIGS. 8A to 8D, after the carrier assembly 40 and the lens assembly 70 are completed, the carrier assembly 40 and the lens assembly 70 are transferred to the fixed table 28 for final installation. The lens assembly 70 is installed to the carrier assembly 40 by inserting the rib 74 of the lens assembly 70 into the trench 44 of the carrier assembly 40, followed by injecting an adhesive in the trench 44 to bond the carrier assembly 40 to the lens assembly 70.

Figure 8A:
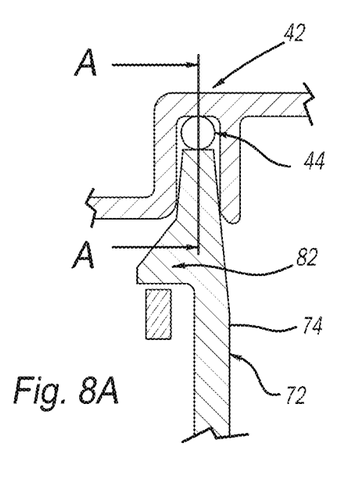
FIG. 8A is a cross-sectional view of a portion of a headlamp assembly, showing an interface between a trench of a carrier assembly and a rib of a lens assembly.

As shown in FIG. 8A, the rib 74 of the lens assembly 70 is inserted into the trench 44 of the carrier assembly 40 and kept in place relative to the carrier assembly 40 by a locking feature formed between the carrier assembly 40 and the lens assembly 70. As an example, the lens assembly 70 may include a protruding tab 82 to be clipped into a hole 84 in the carrier assembly 40.

Figure 8B:
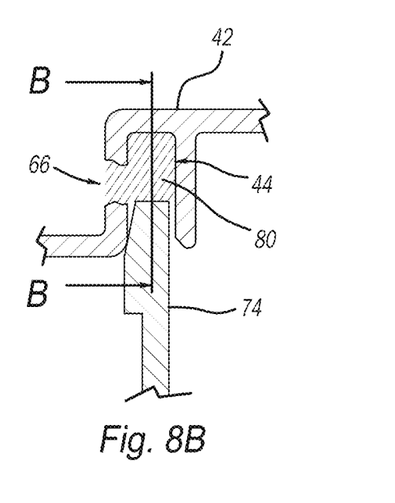
FIG. 8B is a cross-sectional view of a portion of a headlamp assembly, showing another interface between a trench of a carrier assembly and a rib of a lens assembly.
Figure 8C:
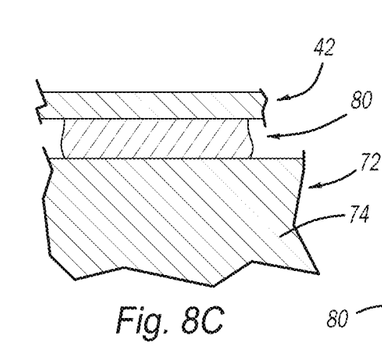
FIG. 8C is a cross-sectional view of a portion of a headlamp assembly, taken along line A-A of FIG. 8A.
Figure 8D:
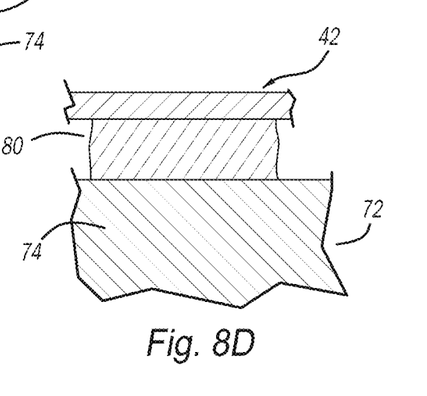
FIG. 8D is a cross-sectional view of a portion of a headlamp assembly, taken along line B-B of FIG. 8B.

As shown in FIG. 8B, thereafter, the adhesive dispensing robot 22 injects an adhesive 80 through at least one port 66 located in the carrier assembly 40 such that the adhesive may flow into the trench 44 along the periphery of the carrier assembly 40 to bond the carrier assembly 40 to the lens assembly 70, thereby completing the headlamp assembly.

Because the adhesive is injected into the trench 44 after the rib 74 is inserted into the trench 44, the carrier assembly 40 and the lens assembly 70 can be assembled in an orientation that the open end of the trench 44 faces down, as opposed to a conventional method where the open end of the trench has to face up to allow the adhesive to be applied and held inside the trench before the lens assembly is installed to the carrier assembly.

In the system of the present disclosure, the carrier assembly is assembled and welded on the first tilting table by the first transfer robot and the first welding robot, when the lens assembly is assembled and welded on the second tilting table by the second transfer robot and the second welding robot. The adhesive dispensing robot may inject an adhesive to the carrier assembly on the first tilting table and to the lens assembly on the second tilting table when needed during assembling of the carrier assembly and the lens assembly. After the carrier assembly and the lens assembly are completed, the carrier assembly and the lens assembly are transferred to the fixed table on which the carrier assembly and the lens assembly are assembled together to form a final headlamp assembly. All of the operations performed by the first and second transfer robots 14, 16, the first and second welding robots 18, 20, and the adhesive dispensing robot 22 occur inside the cell 12.

The system 10 includes a plurality of robots and tilting tables that assemble, attach and seal components of the headlamp assembly together by sonically forming thermoplastic rivet heads, followed by injecting sealant/adhesive for bonding. At least one of the robots sonically melts thermoplastic stake portions protruding from a first component and through a second component to form the thermoplastic rivet heads, thereby joining the two components together. At least one of the robots injects adhesive into one or more channel(s)/spaces between the two components to form a water or air tight seal between the two components. All operations occur inside the cell 12, thereby automating a full-scale headlamp production. Sonic-staking is one of the fastening methods used to install the various components to the sub-assemblies. Sonic staking does not require a molecular bond between the joined materials. Sonic staking is fast and imparts minimal heat to the surrounding surfaces and can individually press and hold parts into a tight assembly. Therefore, the carrier shell and the frame can be designed to have a single design of stake portions to facilitate installing a plurality of components onto the carrier shell and the frame to form the carrier assembly and the lens assembly.

The system and method of the present disclosure has the advantage of reducing manufacturing costs of the headlamp assembly. By using the system and the method according to the present disclosure, parts to be mounted to the carrier shell and the frame may be made by the most cost-efficient high production method such as high-pressure plastic injection molding (HPIM) with no changes to their existing surface finishes.

The robotic sonic fastening cell offers fast assembly as it only holds and fastens parts in place but does not create parts. The wiring harness will be fastened to the internal assembly. The harness will be connected to every electrical interface of components that affix to the carrier shell. The harness will be rigidized to enable its extremities to locate the stakes in the carrier shell. All components will be sonic staked to the shell internally. The electrical harness of lens and light aiming modules will have pigtails to allow later connection manually. The headlamps will be assembled using high quality, high volume production components, thereby eliminating semi-automated machines and operators and simplifying the design of parts and eliminate cumulative position errors.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for assembling a plurality of components into an assembly, comprising:
an installation table;
a first transfer robot configured to assemble some of the plurality of components into a first sub-assembly and transfer the first sub-assembly to the installation table;
a second transfer robot configured to assemble remaining ones of the plurality of components into a second sub-assembly, transfer the second sub-assembly to the installation table, and attach the second sub-assembly to the first sub-assembly; and
an adhesive dispensing robot configured to apply an adhesive between the first sub-assembly and the second sub-assembly, after the second sub-assembly is attached to the first sub-assembly, to bond the second sub-assembly to the first sub-assembly.

2. The system according to claim 1, further comprising a first welding robot configured to sonically weld the some of the plurality of components into the first sub-assembly.

3. The system according to claim 2, further comprising a second welding robot configured to sonically weld the remaining ones of the plurality of components into the second sub-assembly.

4. The system according to claim 3, wherein the first transfer robot and the first welding robot are configured to assemble the plurality of first components into the first sub-assembly when the second transfer robot and the second welding robotic are configured to assemble the remaining ones of the plurality of components into the second sub-assembly.

5. The system according to claim 4, further comprising a first tilting table on which the first sub-assembly is assembled and welded, and a second tilting table on which the second sub-assembly is assembled and welded.

6. The system according to claim 5, wherein the first tilting table, the installation table, and the second tilting table are aligned with the installation table disposed between the first and second title tables.

7. The system according to claim 6, wherein the first and second welding robots are disposed above the first and second tilting tables, respectively.

8. The system according to claim 1, wherein the first and second transfer robots are disposed on opposing sides of the installation table.

9. The system according to claim 1, wherein the adhesive dispensing robot is disposed above the installation table.

10. The system according to claim 1, wherein the first sub-assembly is a carrier assembly including a peripheral trench, and the second sub-assembly is a lens assembly including a peripheral rib.

11. The system according to claim 10, wherein the carrier assembly is assembled to the lens assembly by inserting the peripheral rib into the peripheral trench.

12. The system according to claim 11, wherein the adhesive dispensing robot is configured to inject the adhesive into the peripheral trench after the peripheral rib is inserted into the peripheral trench.

13. The system according to claim 1, further comprising a cell in which the first and second transfer robots, the adhesive dispensing robot, and the installation table are disposed.

14. A system for forming an assembly, comprising:
a first transfer robot configured to attach a first component to a second component;
a first sonic-welding robot configured to sonically weld at least one of the first component and the second component; and
an adhesive dispensing robot configured to apply an adhesive between the first component and the second component to form a first sub-assembly.

15. The system according to claim 14, wherein the first component defines an opening, and the second component includes a stake portion to be inserted into the opening of the first component.

16. The system according to claim 15, wherein the first transfer robot is configured to insert the stake portion of the second component into the opening of the first component.

17. The system according to claim 16, wherein the first sonic-welding robot is configured to sonically weld the stake portion of the second component part to form an enlarged portion.

18. The system according to claim 17, wherein at least one of the first component and the second component defines at least one port in fluid communication with a space between the first and second components such that an adhesive is injected by the adhesive dispensing robot into the space between the first and second components through the at least one port.

19. The system according to claim 14, further comprising:
a second transfer robot configured to attach a third component to a fourth component; and
a second sonic-welding robot configured to sonically weld at least one of the third component and the fourth component,
wherein the adhesive dispensing robot is configured to apply the adhesive between the third component and the fourth component to form a second sub-assembly.

20. The system according to claim 19, wherein the first sub-assembly is assembled and welded by the first transfer robot and the first sonic welding robot when the second sub-assembly is assembled and welded by the second transfer robot and the second sonic welding robot in a same cell.

* * * * *